July 26, 1938.  A. E. ERICKSON  2,124,613
METHOD AND APPARATUS FOR REMOVING ARTICLES FROM MOLDS
Filed Nov. 24, 1936  3 Sheets-Sheet 1

INVENTOR.
ANTON E. ERICKSON
BY
ATTORNEY.

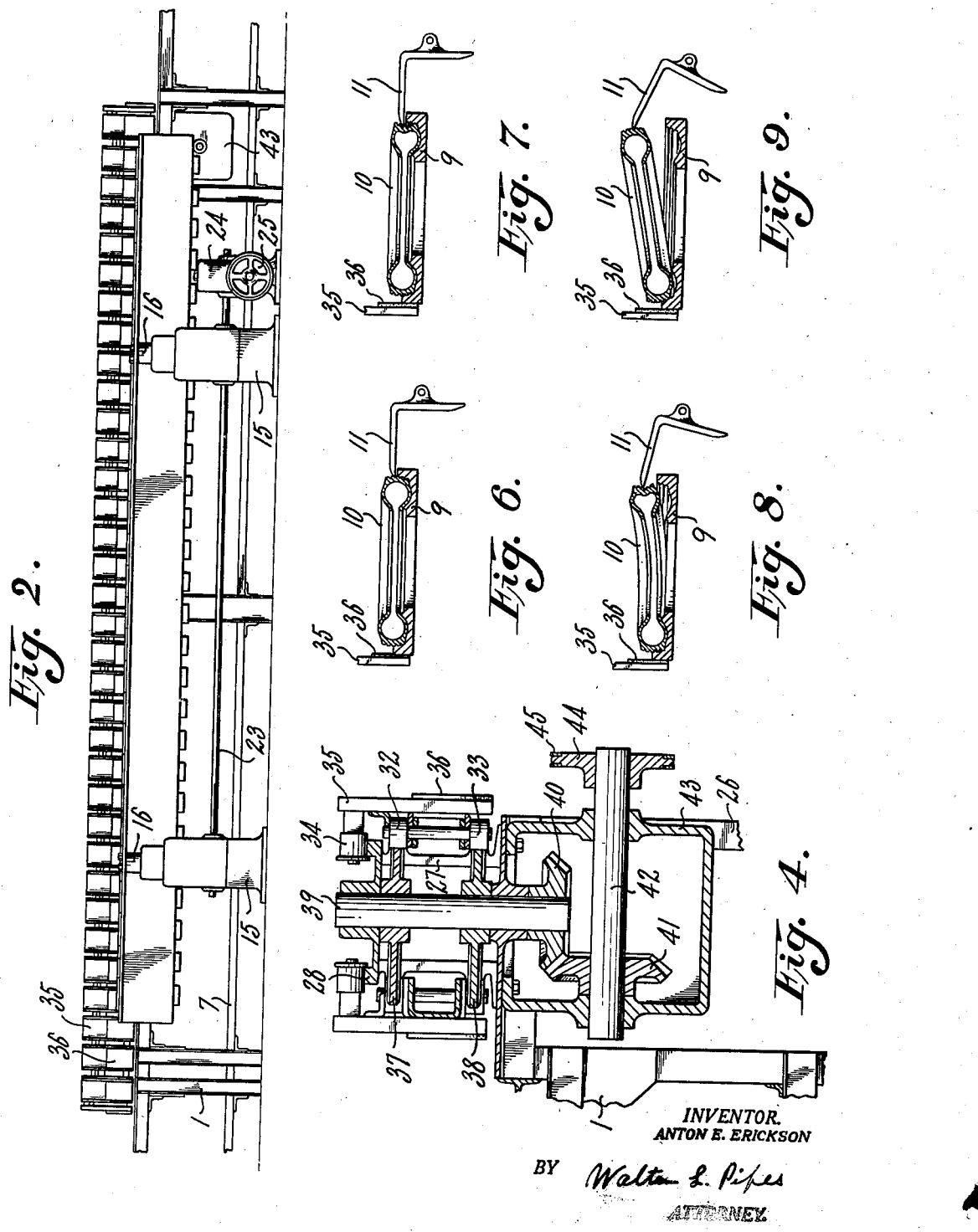

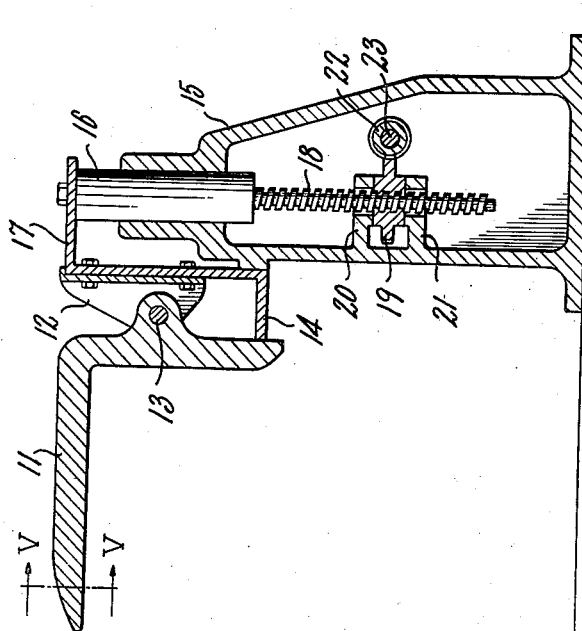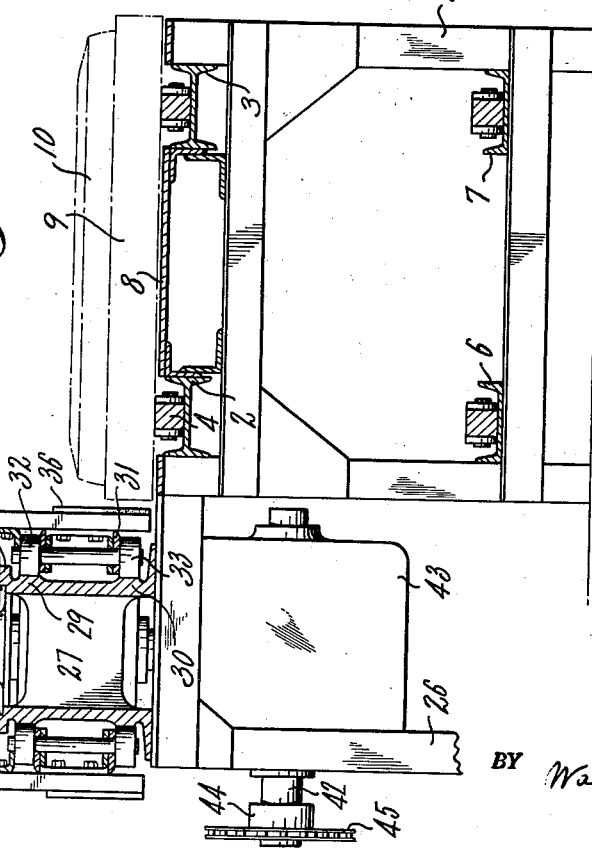

Patented July 26, 1938

2,124,613

UNITED STATES PATENT OFFICE 2,124,613

METHOD AND APPARATUS FOR REMOVING ARTICLES FROM MOLDS

Anton E. Erickson, Milwaukee, Wis., assignor to United States Rubber Products, Inc., New York, N. Y., a corporation of Delaware Application November 24, 1936, Serial No. 112,483

20 Claims. (Cl. 18—2)

This invention relates to a method of, and an apparatus for, loosening and removing rubber articles from molds in which they are formed or vulcanized, and in particular it relates to a method and means for removing pneumatic tires from mold sections after the vulcanizing operation.

In the manufacturing of pneumatic tires and after vulcanization the mold containing a tire is separated, leaving the tire adhering to one of the mold sections. Tires, due to the many projections or ribs forming the tread configuration, adhere in relatively tight engagement to the mold sections. In commercial production it is essential to remove the tires from the mold sections quickly and without injury to the tires.

In general, the invention comprises a conveyor for moving a lower mold section containing a tire along a predetermined path, means disposed adjacent the conveyor for progressively depressing and lifting successive portions of the tire from the mold, and means adjacent the conveyor opposite the first named means for restricting lateral movement of the mold and for imparting rotary movement to the mold as it is moved along the conveyor.

It is, therefore, an object of the present invention to provide a simple and positive apparatus for automatically loosening and removing tires from mold sections as they move along a conveyor. Another object is to provide an apparatus which will be adaptable to continuous production methods, and which will operate without injury or without imparting excessive strains to the tires. A further object is to provide an apparatus capable of accommodating various sizes of molds without requiring adjustment of the apparatus.

Other objects and advantages will appear more fully in the following detailed description, when considered in connection with the accompanying drawings, in which:—

Fig. 2 is a side elevational view thereof;

Fig. 3 is a transverse view, in section, of the apparatus taken along lines III—III of Fig. 1;

Fig. 4 is a transverse view, in section, of means for driving a vertical conveyor, taken along lines IV—IV of Fig. 1;

Fig. 5 is a transverse view, in section, of a stripping finger, taken along lines V—V of Fig. 3; and Figs. 6, 7, 8, and 9 are diagrammatical views, in section, illustrating progressive stages of the loosening and stripping operation.

Figure 1:
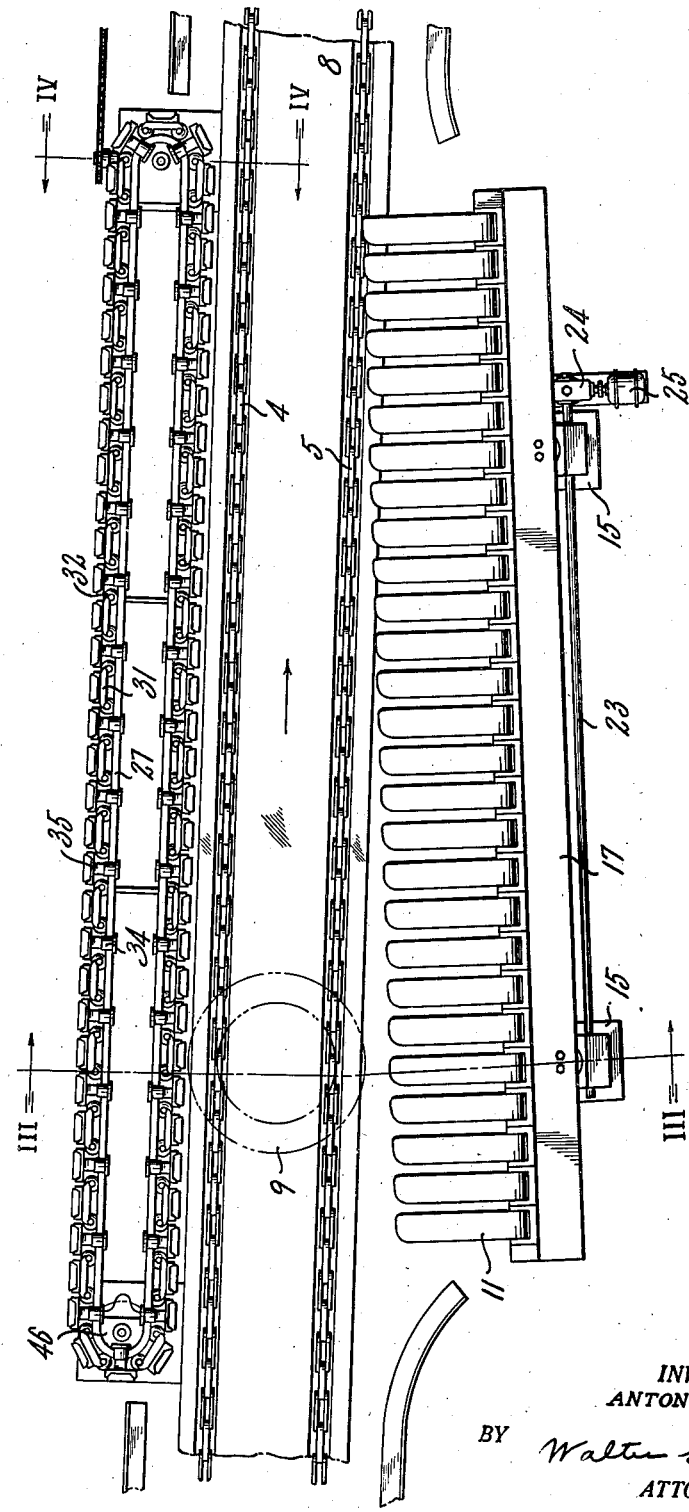
Fig. 1 is a plan view of an embodiment of apparatus for practicing my invention.

The present invention is designed for use in co-operation with a continuously traveling conveyor of conventional form serving to carry tire mold sections on a horizontal plane. In the embodiment which I have illustrated, the upper half or lid of each tire mold is removed in a previous operation, thus leaving the tire projection from and adhering to the lower mold section.

The invention may be divided into three principal components:—a conveyor, stripping means, and means cooperable with the stripping means for rotating the tire mold on the conveyor.

The conveyor is of conventional form, and, as shown in particular in Figs. 1 and 3 of the drawings, comprises essentially a structural framework I supporting conveyor tracks 2 and 3. Endless conveyor chains 4 and 5 ride on the tracks 2 and 3, respectively. Additional tracks 6 and 7 support the chains 4 and 5 in their return movement. A sheet covering 8 in the form of a table top completes the structure of the conveyor.

The conveyor chains move continuously during the operation of the apparatus, by means of a conventional form of driving means, not shown. On top of the conveyor and supported by chains 4 and 5 is shown by dot and dash lines the relative position of a lower mold section 9 and a tire 10 within the mold.

Positioned adjacent to the conveyor is a stripping mechanism comprising a plurality of fingers 11 adaptable to engage with and loosen the tire from the mold. These fingers are disposed in a row, in a plane parallel to the plane defined by the chains 4 and 5, in angular relation to the path of the conveyor. Each finger 11 is of L-shape, the laterally extending portion of which lies substantially in a horizontal plane. A bracket 12 through a pivot 13 supports each finger 11 independently. The fingers may be moved upwardly by pressure exerted against the extending portion, while a stop 14 prevents downward pivotal movement of the fingers.

As shown in Fig. 5, the end portions of the fingers 11 are rounded so that, even though they are lower than the top surface of the mold 9, the fingers will adjust themselves to engage the top surface of the mold. Such a condition is advantageous in that it is essential for the fingers to engage the tire 10 at a point relatively close to the central plane of the tire.

Due to different sizes of molds having different thicknesses, it is desirable to provide means for vertically adjusting the fingers. This is accomplished by the support for the fingers, which in general comprises frames 15 for positioning vertically slidable posts 16. A structural beam 17 to which the brackets 12 are attached is supported by the posts 16. A threaded rod 18 axially extending from each post 16 engages in threaded relation with a worm gear 19 confined between brackets 20 and 21 extending from the frames 15. A worm wheel 22 positioned in complementary relation to the worm gear 19 is supported by a shaft 23 having bearings in the frames 15.

As shown in Fig. 1, the shaft 23 is connected by a gear reduction unit 24 to a motor 25. Depending upon the thickness of the molds 9, the motor 25 may be operated to raise or lower the entire assembly of fingers to suit the most desirable operating conditions. The specific operation of the fingers as they engage the tire will be described hereinafter.

As the fingers 11 engage with the tire 10 there is a tendency for such action to move the tire and mold laterally of the conveyor and away from the fingers. To overcome this condition I provide means for limiting the lateral movement of the tire and mold. This means is in the form of a vertical conveyor which, in addition to providing a backing for the molds, also operates as means for rotating the molds as they move along the conveyor path.

The backing or vertical conveyor is disposed adjacent to the mold carrying conveyor and on the side of the conveyor opposite to the tire stripping fingers. A framework 26 forming a continuation of the mold carrying conveyor supports the vertical conveyor. Positioned on top of the framework 26 is a track support 27 forming a long ovate member and including tracks 28, 29, and 30 (Fig. 3). Rotatable around the track is an endless conveyor chain 31 including rollers 32 and 33 for riding on tracks 29 and 30, respectively. Additional rollers 34 riding on track 28 are secured to blocks 35 attached to the conveyor chain 31. By this means the vertical conveyor is supported as it rotates. A rubber or resilient pad 36 is attached to each of the blocks 35 to provide means of contact with the mold sections 9.

The vertical conveyor is power driven, and its face adjacent to the mold carrying conveyor moves in the same direction as the mold conveyor. The drive for the vertical conveyor is illustrated in particular in Fig. 4, and includes two drive sprockets 37 and 38 which engage with the rollers 32 and 33, respectively, for propelling the conveyor chain and its associated devices. The sprockets 37 and 38 are attached to a shaft 39 journaled in bosses extending from the track support 27 and its connecting members. A miter gear 40 keyed to the shaft 39 meshes with a miter gear 41 mounted on shaft 42. The latter shaft is journaled in bosses forming a part of a gear housing 43. At the outer end of shaft 42 is keyed a sprocket 44 which engages with a chain 45 extending to a source of power.

If desirable, the vertical conveyor may be driven from the mold carrying conveyor and a variable speed unit (not shown) may be interposed between the drive to permit variation of the driving speed of the vertical conveyor relative to the mold carrying conveyor.

At the end of the vertical conveyor opposite the drive end, idler sprockets 46 engage with the rollers 32 and 33 for assisting in the smooth operation of the conveyor.

The operation of the apparatus is diagrammatically illustrated in Figs. 6, 7, 8, and 9. The fingers 11 are angularly disposed relative to the mold carrying conveyor. Therefore, as the mold is carried along with the conveyor it strikes one or more of the fingers. The first action as shown in Fig. 6 is that the mold is moved laterally of the conveyor until it rests against the resilient pads 36 of the vertical conveyor. As the mold continues to move along the conveyor the distance between the vertical conveyor and the fingers lessens with the result that the mold is firmly held against the resilient pads. The result of this contact is such that the mold is moved with a rotary motion along the conveyor.

The fingers act upon the tire in a progressive manner and compress successive portions of the tire to loosen it from the mold, as shown in Fig. 7. As the distance between the fingers and the vertical conveyor is further decreased, the pressure of the tire against the fingers causes the fingers to swing about their pivots, thus resulting in an upward movement of the fingers (Fig. 8). This upward movement, assisted by the pressure of the fingers against the tire, not only loosens the tire in the mold but tends to lift the tire out of the mold. Each successive finger grips the tire independently at a location close to the top of the mold, and as the tire moves upwardly from the mold, the following fingers engage with lower portions of the tire, thereby insuring positive removal of the tire.

As the tire and mold move along the conveyor the action of the vertical conveyor rotates the mold about one complete revolution. However, about three-quarters of a revolution is all that is necessary to effect a complete loosening of the tire from the mold. As the mold is rotated it slides on the chain of the mold supporting conveyor.

Little or no adjustment of the apparatus is necessary to suit the device for different sizes of molds. Any difference in the diameter of the tire or mold is accommodated automatically by the angular disposition of the row of fingers. As the mold enters the stripping apparatus the distance between the fingers and the vertical conveyor may be sufficient to accommodate the largest size of production tire, while the fingers at the opposite end of the apparatus may be close enough to insure proper removal of the smallest production tires from the mold.

Adjustment of the fingers is sometimes necessary in view of the different thicknesses of molds. It is desirable for the lower surface of the fingers to rest upon or closely approach the top surface of the mold. However, if the lower surface of the fingers is slightly below the top surface of the molds no objectionable results will follow as the curvature of the fingers is such that they will strike the mold and, like a cam, ride up and over the top surface of the molds. Such an advantageous feature eliminates the necessity of accurate adjustment.

When a mold carrying a tire reaches the end of the operation of the present apparatus and the tire has been completely loosened from the mold, as shown in Fig. 9, the tire may thereafter be lifted and removed from the mold by any conventional apparatus for such purpose.

The present apparatus effectively loosens tires from molds regardless of the distance between successive molds. For example, the successive molds may be adjacent to each other and the apparatus may start to strip a tire from a mold while the tire in the preceding mold is still in the process of being stripped from its mold.

While I have thus shown and described a positive and efficient method and apparatus for stripping tires from molds, it is to be understood that I contemplate all obvious modifications of the invention except as restricted by the scope of the appended claims.

Having thus described my invention, what I claim and desire to protect by Letters Patent is:—

1. In apparatus for loosening a molded article from a mold member, means for advancing the mold member, means located along the path of the mold advancing means for imparting rotary movement to the mold member, and means located along the path of the mold advancing means for progressively deflecting portions of the article from contact with the mold member.

2. In apparatus for loosening a molded article from a mold member, means for advancing the mold member, means located along the path of the mold advancing means for imparting rotary movement to the mold member, and means located along the path of the mold advancing means for progressively deflecting portions of the article from contact with the mold member and simultaneously effecting a lifting movement of the tire away from the mold member.

3. In apparatus for loosening a molded article from a mold member, means for advancing the mold member, means located along the path of the mold advancing means for progressively deflecting portions of the article from contact with the mold member, and means cooperable with the deflecting means for imparting rotary movement to the mold member.

4. In apparatus for loosening a molded article from a mold member, a conveyor for advancing the mold member, and a plurality of fingers, each having a turning movement in a plane generally transversely of the direction of the movement of the mold, located along the path of the conveyor for progressively deflecting portions of the article from contact with the mold member.

5. In apparatus for loosening a molded article from a mold member, a conveyor for advancing the mold member, and a plurality of rocking fingers located along the path of the conveyor and forming a group angularly disposed relative to the path of the conveyor for progressively deflecting portions of the article from contact with the mold member.

6. In apparatus for loosening a molded article from a mold member, a conveyor for advancing the mold member, and a plurality of independent fingers located along the path of the conveyor for progressively deflecting portions of the article from contact with the mold member, each of said fingers being pivotally supported at a point below the top surface of the mold member.

7. In apparatus for loosening a molded article from a mold member, a conveyor for advancing the mold member, a plurality of fingers located along the path of the conveyor for progressively deflecting portions of the article from contact with the mold member, and means located along the path of the conveyor and opposite said fingers for imparting rotary movement to the mold member.

8. In apparatus for loosening a molded article from a mold member, a conveyor for advancing the mold member, and a plurality of independent rocking fingers located along the path of the conveyor for progressively deflecting portions of the article from contact with the mold member, said fingers being progressively positioned in the direction of movement of the conveyor closer to the path of the conveyor.

9. In apparatus for loosening a molded article from a mold member, a conveyor for advancing the mold member, and a plurality of independent rocking fingers located along the path of the conveyor for progressively deflecting portions of the article from contact with the mold member, said fingers being positioned horizontally closer to the path of the conveyor at the advanced end of the conveyor than at the advancing end of the conveyor.

10. In apparatus for loosening a molded article from a mold member, a conveyor for advancing the mold member, a plurality of fingers located along the path of the conveyor for progressively deflecting portions of the article from contact with the mold member, and means located along the path of the conveyor and opposite said fingers for imparting rotary movement to the mold member, the distance between said fingers and said means for imparting rotary movement progressively decreasing in the direction of movement of the conveyor.

11. In apparatus for loosening a molded article from a mold member, a conveyor for supporting and advancing the mold member, a second conveyor positioned at one side of the first named conveyor and movable in the direction of the first named conveyor, and a plurality of fingers located along the path of the mold advancing conveyor for progressively deflecting portions of the article from contact with the mold member and for moving the mold member into engagement with the second conveyor.

12. The method of loosening a tire from a mold member, which comprises advancing the mold member along a determinate path, imparting rotary movement to the mold member as it is advanced, and progressively deflecting portions of the tire from contact with the mold and simultaneously effecting a lifting action against said tire portions.

13. The method of loosening a tire from a mold member, which comprises advancing the mold member along a determinate path, imparting rotary movement to the mold member as it is advanced, progressively deflecting portions of the tire from contact with the mold member and simultaneously effecting a lifting action against said tire portions, and progressively increasing the deflecting and lifting actions.

14. The method of loosening a tire from a mold member, which comprises advancing the mold member along a determinate path, imparting rotary movement to the mold as it is advanced, and applying lateral pressure against the crown of the tire for deflecting portions of the tire from contact with the mold member and exerting a lifting force on the tire and away from the mold member.

15. The method of loosening a tire from a mold member, which comprises rolling a mold member on a horizontal plane along a determinate path while applying progressively increased pressure laterally of the crown of the tire for deflecting circumferentially successive portions of the tire from contact with the mold member.

16. The method of loosening a tire from a mold member, which comprises rolling a mold member on a horizontal plane along a determinate path while applying progressively increased pressure laterally of the crown of the tire for deflecting circumferentially successive portions of the tire from contact with the mold member, and simultaneously exerting a lifting force on the tire away from the mold member.

17. In apparatus for loosening a tire from a mold member, a conveyor for tire molds, a plurality of fingers located at one side of the conveyor for progressively deflecting portions of the tire from contact with the mold member, each of said fingers being pivotally supported in a manner resulting in upward movement of the fingers upon the application of lateral pressure against the fingers.

18. In apparatus for loosening a tire from a mold member, a conveyor for advancing the mold member, a plurality of fingers located at one side of the conveyor for progressively deflecting portions of the tire from contact with the mold member, each of said fingers being pivotally supported in a manner resulting in upward movement of the fingers upon the application of lateral pressure against the fingers, and means for controlling the normal elevation of the fingers.

19. In apparatus for loosening a tire from a mold member, a conveyor for advancing the mold member, means located along the path of the conveyor for imparting rotary movement to the mold member, and a plurality of fingers located at one side of the conveyor for progressively deflecting portions of the tire from contact with the mold member, each of said fingers being pivotally supported in a manner resulting in upward movement of the fingers upon the application of lateral pressure against the fingers.

20. In apparatus for loosening a tire from a mold member, a conveyor for advancing the mold member, means located along the path of the conveyor for imparting rotary movement to the mold member, and a plurality of fingers located at one side of the conveyor for progressively deflecting portions of the tire from contact with the mold member, each of said fingers being pivotally supported in a manner resulting in upward movement of the fingers upon the application of lateral pressure against the fingers, and the distance between said fingers and said means for imparting rotary movement progressively decreasing in a direction toward the discharge end of the apparatus.

ANTON E. ERICKSON.